United States Patent
Maestrini et al.

(10) Patent No.: US 9,400,025 B2
(45) Date of Patent: Jul. 26, 2016

(54) BRAKE CALIPER WITH COOLING SYSTEM

(75) Inventors: Luca Maestrini, Bergamo (IT); Andrea De Angeli, Milan (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 1830 days.

(21) Appl. No.: 12/516,312

(22) PCT Filed: Dec. 18, 2006

(86) PCT No.: PCT/IT2006/000856
§ 371 (c)(1),
(2), (4) Date: May 26, 2009

(87) PCT Pub. No.: WO2008/075386
PCT Pub. Date: Jun. 26, 2008

(65) Prior Publication Data
US 2010/0084226 A1      Apr. 8, 2010

(51) Int. Cl.
*F16D 65/847*    (2006.01)
*F16D 55/228*    (2006.01)
*F16D 125/06*    (2012.01)

(52) U.S. Cl.
CPC ............ *F16D 65/847* (2013.01); *F16D 55/228* (2013.01); *F16D 2125/06* (2013.01)

(58) Field of Classification Search
CPC .................................................... F16D 65/847
USPC ................... 188/71.6, 264 A, 264 AA, 264 R
See application file for complete search history.

(56) References Cited

U.S. PATENT DOCUMENTS

| | | | | |
|---|---|---|---|---|
| 4,440,270 A | * | 4/1984 | Ross | 188/264 AA |
| 6,446,766 B1 | * | 9/2002 | Cornolti et al. | 188/264 A |

FOREIGN PATENT DOCUMENTS

| | | |
|---|---|---|
| DE | 3833552 | 4/1990 |
| EP | 1533538 | 5/2005 |
| EP | 1610027 | 12/2005 |
| JP | 62-67337 | 3/1967 |
| JP | 03-194226 | 8/1991 |
| WO | 83/01664 | 5/1983 |

OTHER PUBLICATIONS

Translation of EP 1610027, Halasy-Wimmer et al., Dec. 2005. Obtained from EPO website.*

* cited by examiner

*Primary Examiner* — Thomas J Williams
(74) *Attorney, Agent, or Firm* — Davis & Bujold PLLC; Michael J. Bujold

(57) ABSTRACT

A brake caliper for disc brake has two side walls, one on either side of a brake rotor or disc. Each of the side walls has at least one seat which receives a brake pad having a friction surface which engages the disc, and a thrust surface opposite the friction surface. A brake piston engaging the thrust surface of the pad pushes the pad against the brake disc. The caliper has cooling ducts for conveying a flow of cooling air to the pad. These cooling ducts comprise a first outlet port that is configured to generate a first partial cooling flow on the side of the friction surface of the pad and a second outlet port configured to generate a second partial cooling flow on the side of the thrust surface of the pad.

14 Claims, 13 Drawing Sheets

BRAKE CALIPER WITH COOLING SYSTEM

BACKGROUND OF THE INVENTION

The object of the present invention is a brake caliper for a disc brake, particularly for a disc brake of a high-performing vehicle.

High-performing vehicles, for example race vehicles, are currently capable of attaining very high maximum speeds. Their braking systems are thus required to ensure effective braking, i.e. limited braking space and a response to the action of braking that is even over time, for example throughout a run.

While braking, the heat resulting from the friction occurring between the pad linings made of friction material and the disc causes the overheating of several brake components. Particularly, the disc and pads may overheat, thus leading to a consequent alteration in the characteristics of the materials of which they are made, and hence an overall decrease in the braking effectiveness. Furthermore, due to the contact between the very hot pads and the cylinder-piston units that operate the latter, the braking system fluid can overheat, with the consequent risk of boiling. These events can cause a considerable alteration in the response to the braking action and irreversible damages to the braking system.

To obviate these problems, brake calipers are provided with suitable cooling systems. To the purpose, a number of solutions are known.

JP 03-194226 describes a brake caliper for a disc brake in which a same flow of cooling air is conveyed by means of ducts to the rear area of the pads, and subsequently, by passing through passageways formed in the thickness thereof, it reaches the interface between pads and disc. However, this solution requires the through-ducts to be formed in the pads, with the consequent reduction in the friction surface that presses against the disc while braking. Furthermore, the cooling by the flow of cooling air can only occur when the pads are not in contact with the disc, since the passageways formed in the pads are frontally occluded by the disc while braking.

JP 62-67337 describes a brake caliper of a disc brake in which an individual flow of cooling air is conveyed in a cavity being formed in a pad-operating piston, from which it subsequently reaches the seat of the disc and pads through radial openings in the piston. However, according to this solution, the flow of cooling air sequentially passes through the piston cavity and the disc area and it is already heated when it reaches the latter, and thus ensuring a cooling action to be only carried out in the area between the piston and pad.

OBJECT AND SUMMARY OF THE INVENTION

The object of the present invention is thus to provide a brake caliper for a disc brake, which is provided with a cooling system such as to overcome the drawbacks cited with reference to the prior art.

Particularly, the object of the present invention is to provide a brake caliper for a disc brake, which is provided with a cooling system such as to avoid the overheating of the disc, pads and braking system fluid also under particularly severe conditions of use, i.e. repeated, long violent brakings.

These and other objects are achieved by means of a brake caliper for a disc brake, which comprises:

two side walls spaced apart from each other, which define a disc space for accommodating a portion of a brake disc, in which a first of these side walls comprises means for rotatably and translatably integrally fixing the caliper to a vehicle and the side walls are connected to each other by means of a connecting structure extending astride the disc space, in which each of these side walls defines at least one seat suitable to accommodate at least one pad having a friction surface that is intended to engage the disc and a thrust surface opposite the friction surface;

thrust means suitable to engage the thrust surface of the pad to push it against the brake disc in order to tighten the latter;

cooling ducts suitable for conveying a flow of cooling air to the pad, wherein these cooling ducts comprise:

a first outlet port that is configured for generating a first partial cooling flow on the side of the friction surface of the pad;

a second outlet port that is different from the first outlet port and configured for generating a second partial cooling flow on the side of the thrust surface of the pad, wherein this second partial cooling flow is different from the first partial cooling flow.

BRIEF DESCRIPTION OF THE DRAWINGS

In order to better understand the invention and appreciate the advantages thereof, some exemplary and non-limiting embodiments of the same will be described below, with reference to the annexed figures, in which.

DETAILED DESCRIPTION OF THE PREFERRED EMBODIMENTS

With reference to the figures, a brake caliper for a disc brake is designated with numeral 1.

The caliper 1 can be fixed by means of fixing means, such as screws, to a suspension of the vehicle, whereas a brake disc 15 of the disc brake having an annular braking band can be connected to the vehicle wheel hub. The brake disc 15 defines a plane P of the brake disc.

Figure 1:
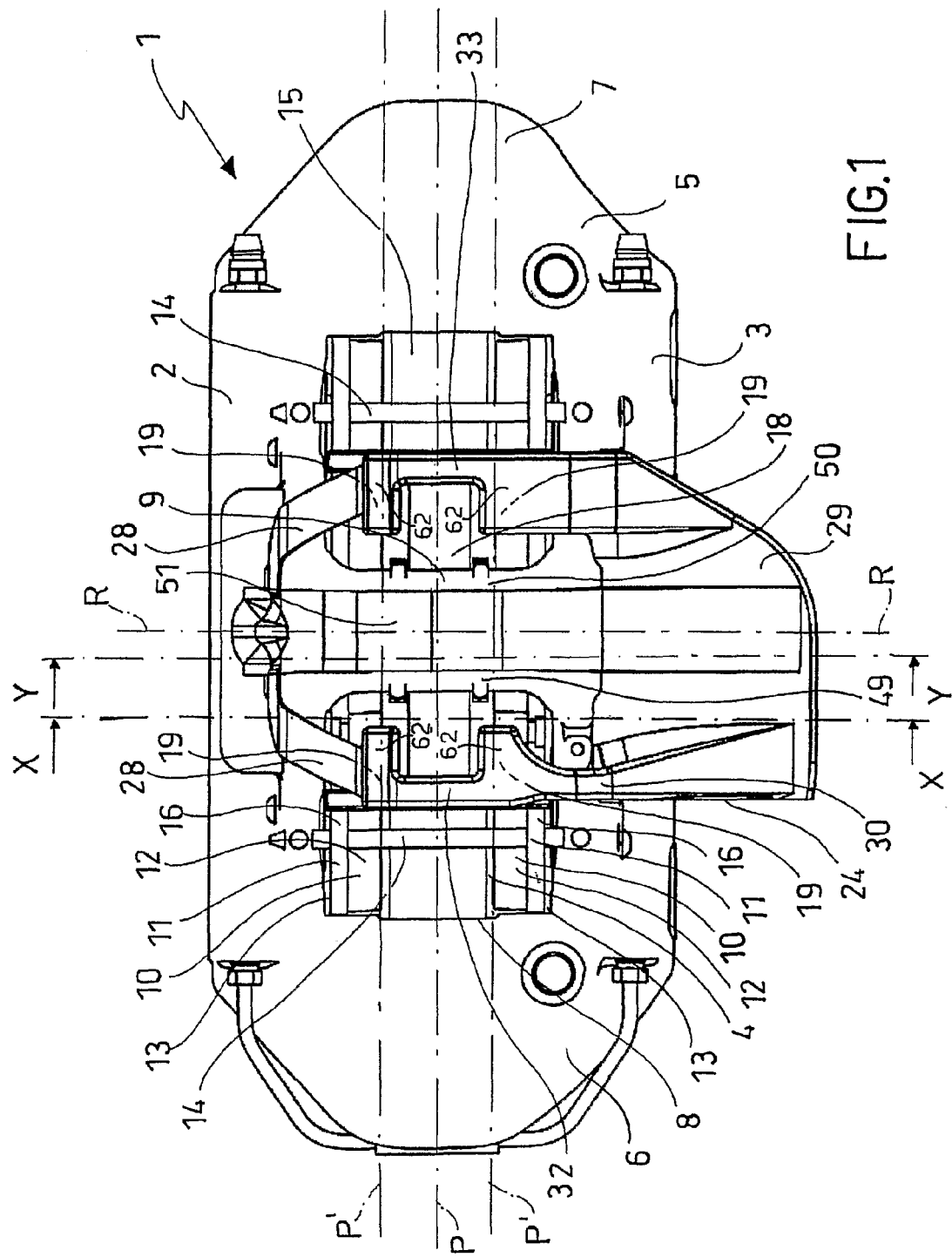
FIG. 1 is a front view of a disc brake with a brake caliper according to the invention.

The caliper 1 comprises two side walls 2 and 3, respectively, a first side wall 3 on the suspension side, in which the fixing means are formed, and a second side wall 2 on the wheel side. These side walls 2 and 3 are arranged spaced apart from each other such as to define a disc space 4 suitable for accommodating a portion of the brake disc 15 and connected by means of a connecting structure 5, which extends astride the disc brake 4 (FIG. 1).

Preferably, this connecting structure 5 comprises two end bridges 6 and 7, which define a middle port 8, as well as a bridge element 9 arranged at this middle port 8 which connects the two side walls 2 and 3 such as to restrain the deformation of the caliper 1 while braking.

Preferably, the bridge element 9 is arranged about in the center of the middle port 8, such as to divide the same in two half-ports having substantially the same extension.

At least one, preferably two pads 10 comprising a plate 11, such as made of steel, which carries a lining of friction material 12 can be each arranged on a side of the brake disc 15 at the braking band thereof, and be accommodated within seats 13 defined by the side walls 2 and 3 of the caliper 1. Preferably, the pads 10 are supported by two support pins 14 that have such as size and mechanical resistance that are sufficient to allow the pads 10 to be hung to these support pins 14 such as by means of a hole or slot formed in the plate 11 at an upper edge 16 thereof in order to avoid radial displacements (with reference to the axis of rotation R-R of the brake disk 15) of the pads 10.

Figure 8:
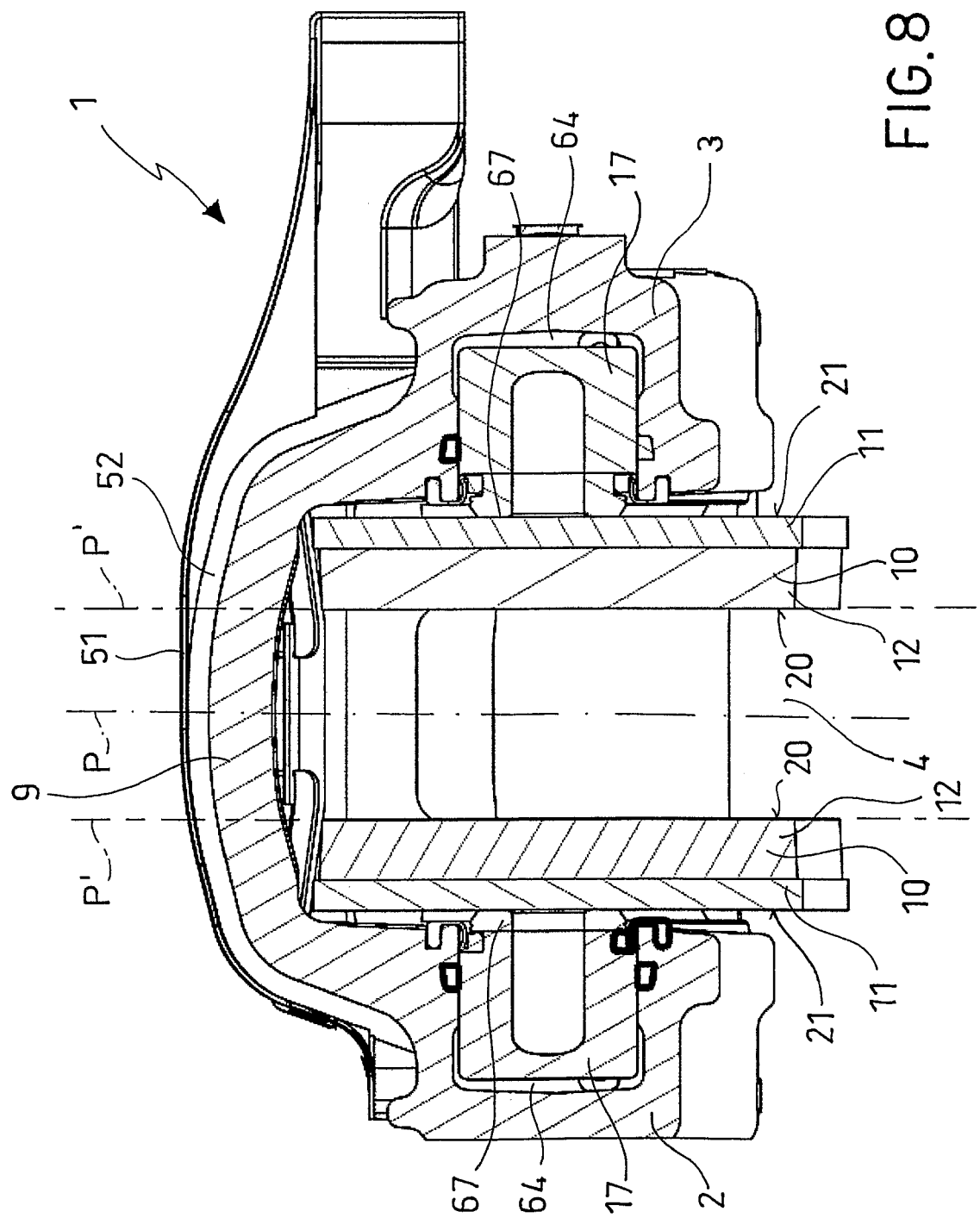
FIG. 8 is a sectional view along line Y-Y in FIG. 1 of the brake caliper of the disc brake in FIG. 1.
Figure 9:
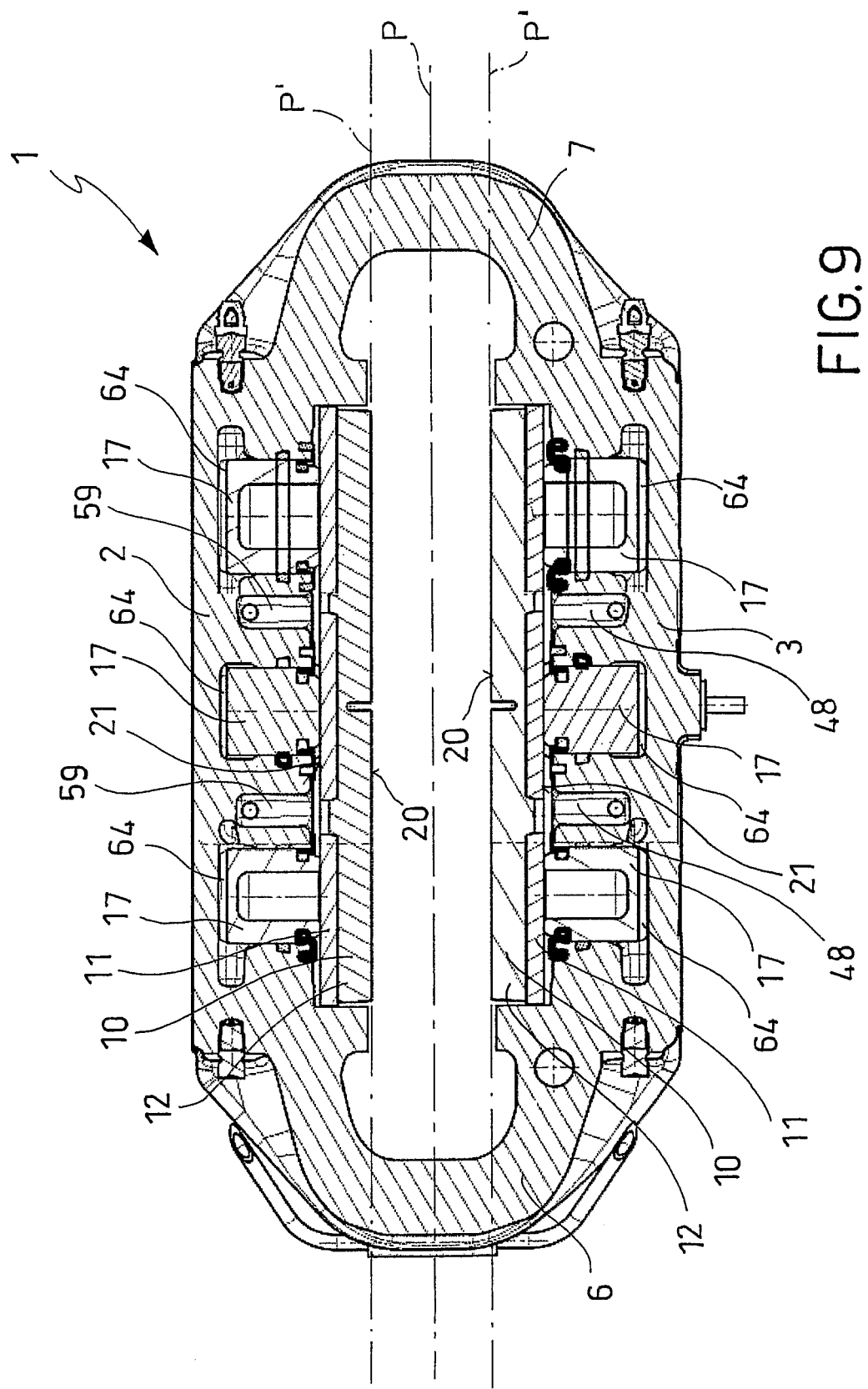
FIG. 9 is a sectional view along line Z-Z in FIG. 3 of the brake caliper in FIG. 3.

The pads 10, which can be displaced in the perpendicular direction to the plane P of the brake disc 15 can be operated by means of thrust means 17, such as one or more hydraulic cylinder-piston units, which are arranged in the side walls 2 and 3 of the caliper 1, such as to tighten, by means of the friction lining 12, a sector of the braking band of the brake disc 15 (FIGS. 8 and 9).

The brake caliper 1 further comprises a plurality of ducts which are suitable for conveying a flow of cooling air to each of the pads 10.

Figure 4:
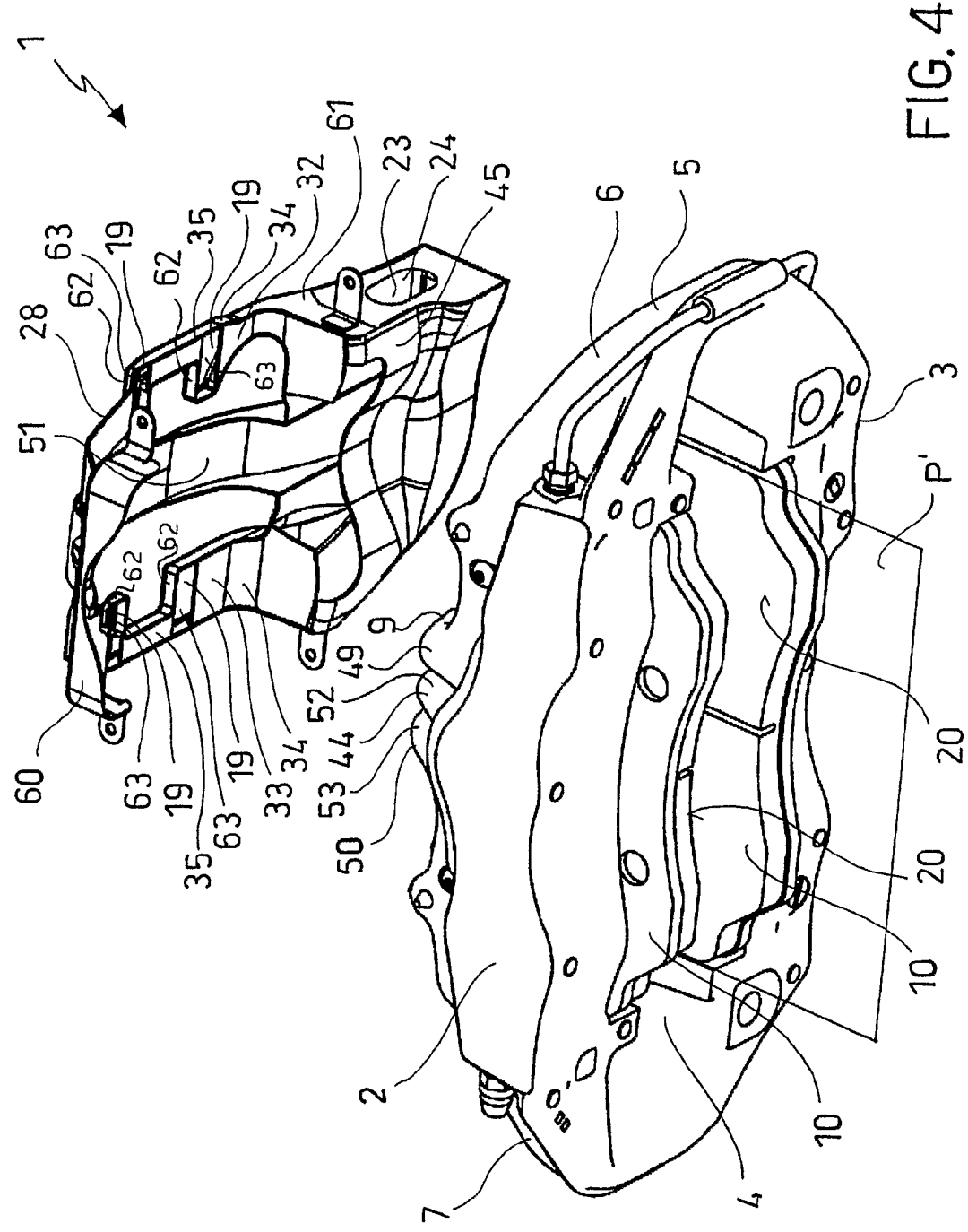
FIG. 4 is an exploded perspective view of the brake caliper of the disc brake in FIG. 1.
Figure 7:
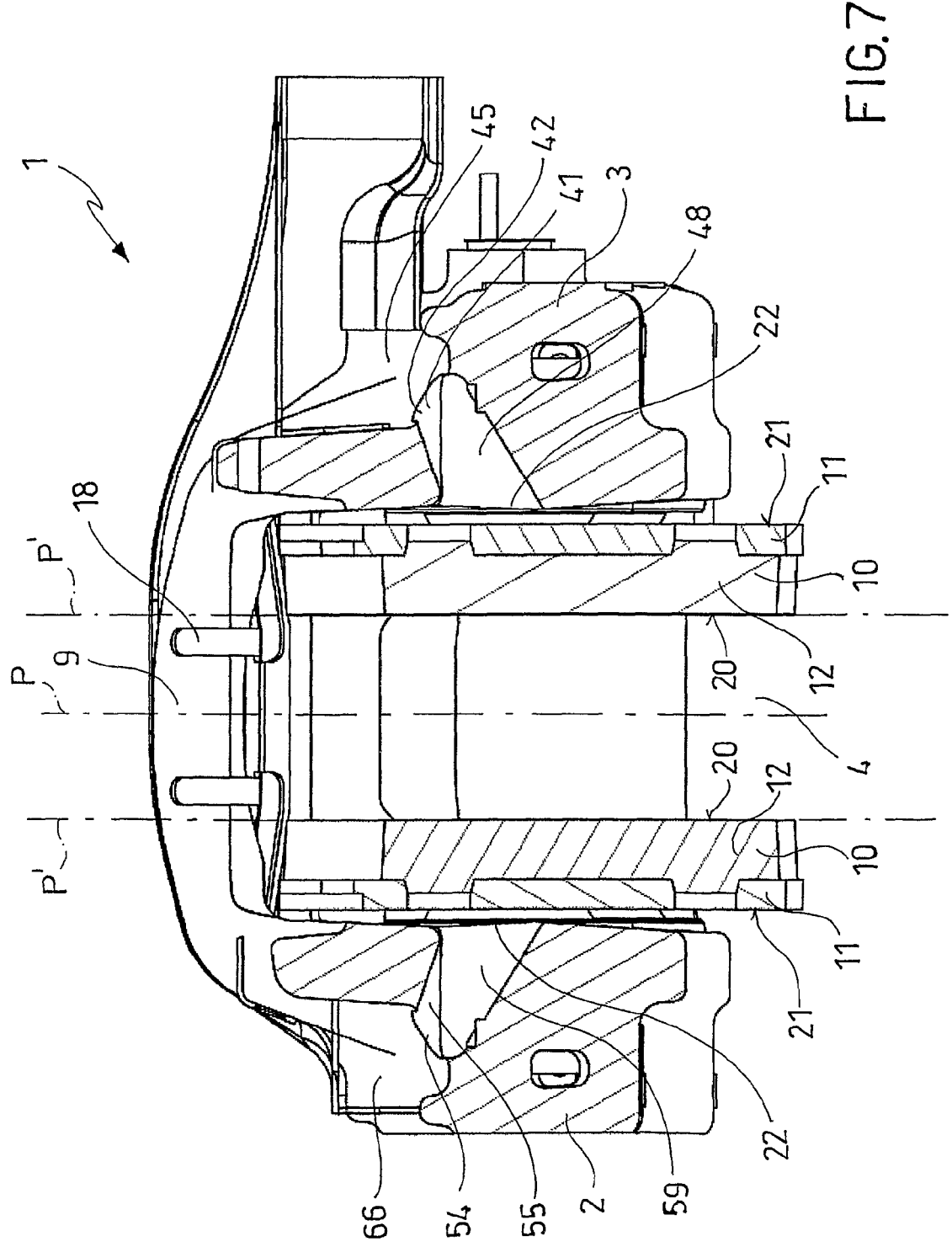
FIG. 7 is a sectional view along line X-X in FIG. 1 of the brake caliper of the disc brake in FIG. 1.

Advantageously, these cooling ducts comprise at least one first outlet port 19, which is configured such as to generate a first partial cooling flow on the side of the pad 10 having a friction surface 20 which is intended to engage the brake disc 15 (FIG. 4). Furthermore, these cooling ducts comprise at least one second outlet port 22 which is different from the first outlet port 19 and is configured such as to generate a second partial cooling flow, different from the first partial cooling flow, on the side of the pad 10 having a thrust surface 21, i.e. on the side of the pad 10 that is contacted to the thrust means 17, opposite the side of the friction surface 20 (FIG. 7).

Advantageously, the first outlet port 19 is radially arranged outside the pad 10 and preferably faces the interface between the friction surface 20 of the pad 10 and the corresponding friction surface of the brake disc 15. Furthermore, the first outlet port 19 is advantageously arranged such that a plane P' defined by the friction surface 20 of the pad 10 (see, for example, FIGS. 1 and 2) intersects the first outlet port 19. Thereby, the first partial cooling flow is conveyed to the interface between the friction surface 20 of the pad and the corresponding friction surface of the disc and can thus brush the friction material lining 12 as well as the portion of the braking band of the brake disc 15 opposite the pad 10.

Further advantageously, the second outlet port 22 is formed in the first side wall 3 of the caliper 1 and is configured such that the second partial cooling flow is directed transversal to the plane P' of the pad 10 and thus directly hits the thrust surface 21 of the pad 10. In accordance with an embodiment, the second partial cooling flow is directed in the direction substantially orthogonal to the thrust surface 21 of the pad 10. In accordance with a further embodiment, the second partial cooling flow has an orthogonal component and a tangential component to the thrust surface 21, such that the air can be propagated along the thrust surface 21 thus cooling the latter in a uniform manner. Furthermore, the tangential component causes the second partial cooling flow to meet also thrust means 17 along its path, thus cooling the latter. Thereby, a overheating as well as the boiling of the hydraulic fluid in contact with the piston is prevented.

In accordance with an embodiment, on both sides of the plane P of the brake disc 15, i.e. on both sides of the brake disc 15 when the latter is connected to the caliper 1 to form the disc brake, one or more of these first outlet ports 19 and these second outlet ports 22 are formed. Thereby, one or more first and second partial cooling fluids are generated on both sides of the plane P of the disc, and the pads 10 can be thus cooled, which act on each side of the brake disc 15, as well as the disc on both sides thereof, and the thrust means 17 formed in the two side walls 2 and 3. Each of the opposite pads 10 is cooled, both on the side of the friction surface 20 and on the side of the thrust surface 21.

In accordance with a further embodiment, on each side of the plane P of the brake disc 15, two first outlet ports 19 are formed, such as to generate two different first partial cooling flows at the friction surface 20 of each of the opposite pads 10 and at the friction surface of the braking band opposite thereto and thus ensure a uniform cooling thereto. Furthermore, two second outlet ports 22 are formed on each side of the plane P of the brake disc 15, such as to generate two different second partial cooling flows at the thrust surface 21 of each of the opposite pads 10 and on the thrust means 17 operating the latter, thus ensuring a uniform cooling also on the side of the thrust surface 21 of each pad 10 as well as a reduction in the heating of the braking system fluid.

Figure 2:
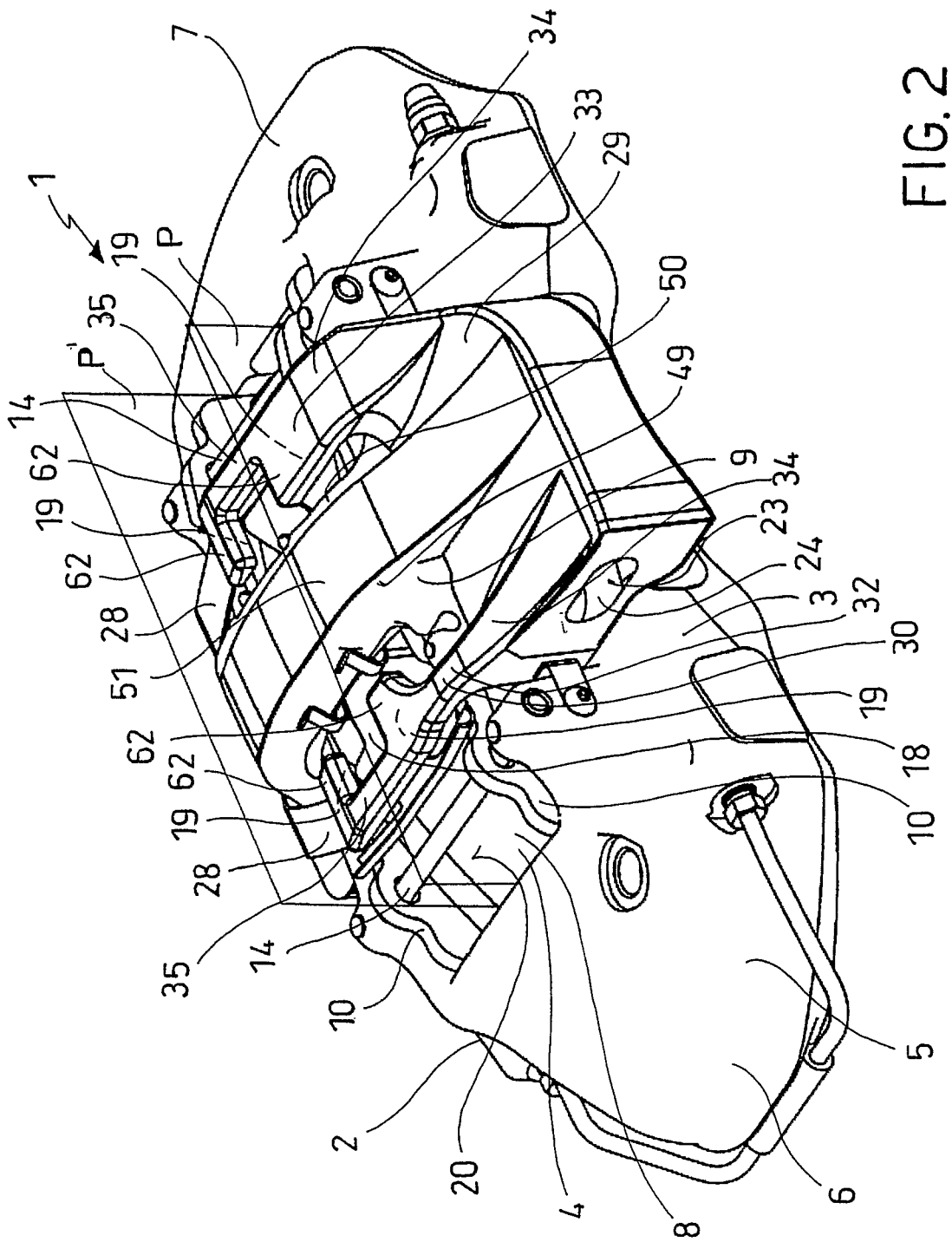
FIG. 2 is a perspective view of the brake caliper of the disc brake in FIG. 1.

Advantageously, the cooling ducts comprise, preferably arranged on the first side wall 3 of the caliper 1, a feeding duct 23 having an inlet port 24 suitable to take cooling air to be conveyed to the first and second outlet ports 19 and 22 (see for example FIG. 2). This feeding duct 23 may be optionally connected to an air intake (not shown in the figures) to receive air from the outside of the brake, for example using either fan means or only the speed of the vehicle on which the brake is mounted. According to an embodiment, this inlet port 24 is oriented transversal, preferably orthogonal to the plane P of disc 15.

Advantageously, the feeding duct 23 comprises a plurality of different sub-ports which are suitable to partition the air entering the inlet port 24 into a plurality of partial cooling flows that are conveyed in different ducts. The partition of the air flow by means of sub-ports and separate ducts ensures that the air is desirably distributed to the locations that are intended to be cooled.

Advantageously, the cooling ducts comprise two outer cooling ducts 32 and 33 that run radially outside the disc space 4 of caliper 1. These outer cooling ducts 32 and 33 are connected to the inlet duct 23 such that at least one portion of the air entering the inlet port is conveyed thereto. Preferably, these two outer cooling ducts 32 and 33 extend on both sides of the middle bridge element 9 that connects the two side walls 2 and 3 of the caliper 1. Particularly, the first 32 of these outer cooling ducts 32 and 33 is arranged on the side of the end bridge 6, and the second 33 of these outer cooling ducts 32 and 33 is arranged on the side of the end bridge 7 (see, for example FIG. 1).

In accordance with an embodiment, the outer cooling ducts 32 and 33 are cantilevered from the first side wall 3 of the suspension side of caliper 1.

In accordance with a further embodiment, the outer cooling ducts 32 and 33 are supported at the wheel side of caliper 1 by one or more supports 28, preferably in a number of two and opposite to each other relative to the bridge element 9.

Figure 5:
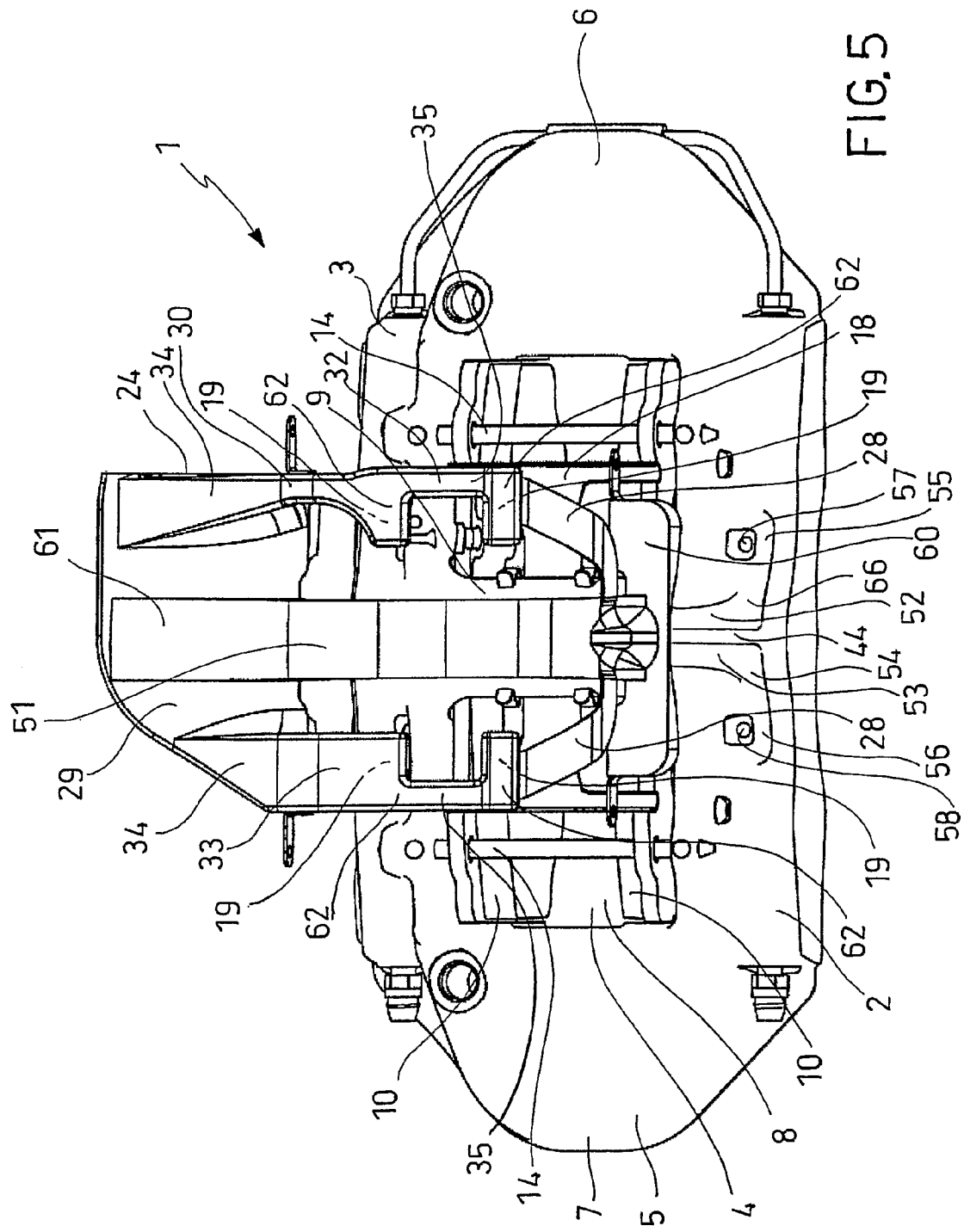
FIG. 5 is an exploded perspective view of the brake caliper of the disc brake in FIG. 1 from a different point of view.

The two outer cooling ducts 32 and 33, such as having a substantially rectangular section, can comprise a joining portion 34 and a delivery portion 35 which is in fluid communication with the feeding duct 23 by means of the joining portion 34 (FIGS. 2, 4, and 5).

To cause the cooling air being conveyed within the outer cooling ducts 32 and 33 to be blown in a substantially symmetrical manner relative to the plane P of the brake disc 15, the delivery portions 35 are preferably rectilinear, and most preferably, parallel to the bridge element 9.

Advantageously, each of the outer cooling ducts 32 and 33 forms in the delivery portions 35 one or more, preferably two, of the first outlet ports 19 that are opposite relative to plane P of brake disc 15. Thereby, the first outlet ports 19 formed by each of the two outer cooling ducts 32 and 33 globally generate four first partial cooling flows, particularly two first partial cooling flows which are opposite relative to the bridge element 9 on both sides of the plane P of the brake disc 15.

Advantageously, each of these first outlet ports 19 of the outer cooling ducts 32 and 33 is formed by a diffusing element 62 that defines an outlet slot 63. Preferably, this outlet slot 63 has an extension parallel to the plane P' of the pad 10, which is greater than or substantially equal to the width of the corresponding outer cooling duct 32 or 33 in which these diffusing elements 62 are formed (FIG. 4). Thereby, a high diffusion of the first partial cooling flows is ensured without the middle port 8 being obstructed, which is a further means for heat exchange.

Preferably, the diffusing elements 62 are cantilevered from the delivery portions 35 of the outer cooling ducts 32 and 33 to the bridge element 9.

In accordance with an embodiment, the joining portion 34 of one of the outer cooling ducts 32 and 33, or at least a part thereof, has a section having a greater extension than the section of the joining portion 34 of the other outer cooling duct. Preferably, the joining portion 34 or part thereof, of the second outer cooling duct 33 has the section with a greater extension than that of the first outer cooling duct 32.

The joining portions 34 of the outer cooling ducts 33 and/or 34, preferably the joining portion 34 of the second outer cooling duct 33 can comprise a deflecting portion 29 suitable to cause one or more changes of direction of the cooling air blowing from the inlet duct 23 (FIG. 5).

The joining portions 34 of the outer cooling ducts and 33 can have sections either with substantially constant or variable extensions.

In accordance with an embodiment, the joining portion of 34 of the second outer cooling duct 33 proximate to the first diffusing element 62 encountered by the cooling air has a substantially constant section.

In accordance with a further embodiment, the section of the joining portion 34 of the first outer cooling duct 32 has a narrowing 30 proximate to the first diffusing element 62 encountered by the cooling air, such as to impose an acceleration to the air.

The delivery portions 35 of the outer cooling ducts and 33 have preferably, though not necessarily, a constant section. According to an embodiment, the sections of the delivery portions 35 of the outer cooling ducts 32 and 33 are substantially equal to each other.

Figure 6:
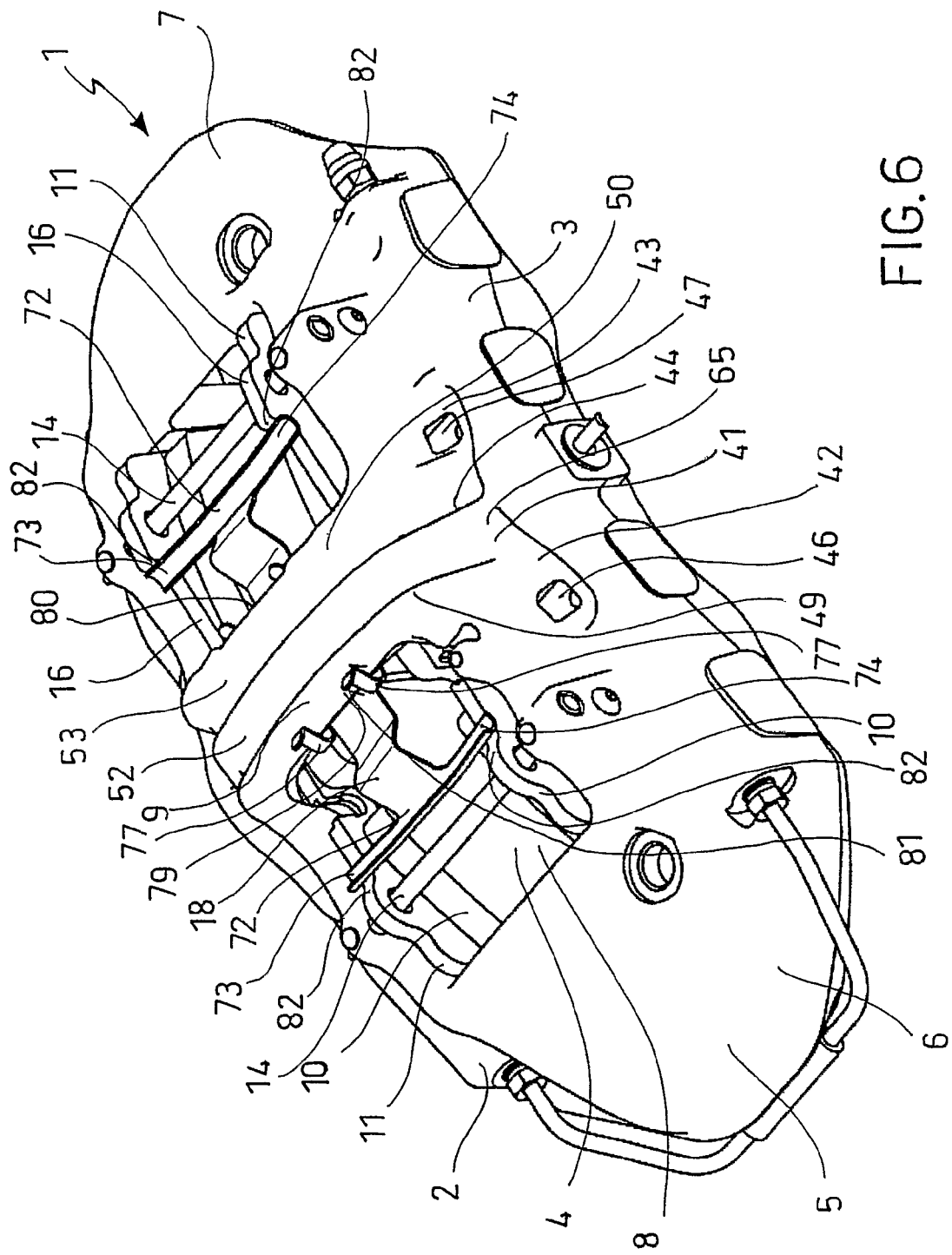
FIG. 6 is a perspective view of a detail of the brake caliper of the disc brake in FIG. 1.

Advantageously, the feeding duct 23 is in fluid communication with a communication passageway 41 being at least partially formed in the first side wall 3 of the caliper 1 (FIGS. 6 and 7). The communication passageway 41 preferably comprises first and second chambers 42 and 43, which are different and separated from each other via a partition wall 44. The communication passageway 41 and the first and second chambers 42 and 43 can be defined by a portion 65 of the side wall 3 and by a preferably though not necessarily removable upper cover 45.

Ports 46 and 47 are formed in the chambers 42 and 43, respectively, which fluidically communicate these chambers 42 and 43 with the inner cooling ducts 48 that convey the cooling air to one or more of the second outlet ports 22 in the caliper suspension side. The inner cooling ducts 48 and the outlet ports 22 of the caliper suspension side are preferably formed in the first side wall 3 of the caliper 1, such as to reduce the overall inner and outer size of the brake caliper 1.

Advantageously, the inner cooling ducts 48 are adjacent one or more cylindrical seats 64 of the cylinder-piston units being formed in the first side wall 3 (FIGS. 8 and 9), such that the second partial cooling flows also hit, in addition to the thrust surface 21 of the pad 10, the thrust means 17, preferably at active ends 67 thereof. These active ends 67 are directly contacted with the thrust surfaces 21 of the pads 10 and are configured such as to dissipate the heat and consequently to reduce the amount of the latter which is transmitted by the pad 10 to the braking system fluid that operates the pistons. These active ends 67 may, though not necessarily, comprise radiating elements (not shown in the figures) having a plurality of radial holes for a suitable cooling fluid to flow therethrough, in the instant case the second partial cooling flows.

In accordance with an embodiment, the cylindrical seats 64 of the cylinder-piston units formed in the side wall 3 are in a number of three and are arranged such that one of the inner cooling ducts 48 (FIG. 9) can be arranged between each pair of adjacent cylindrical seats 64.

Figure 3:
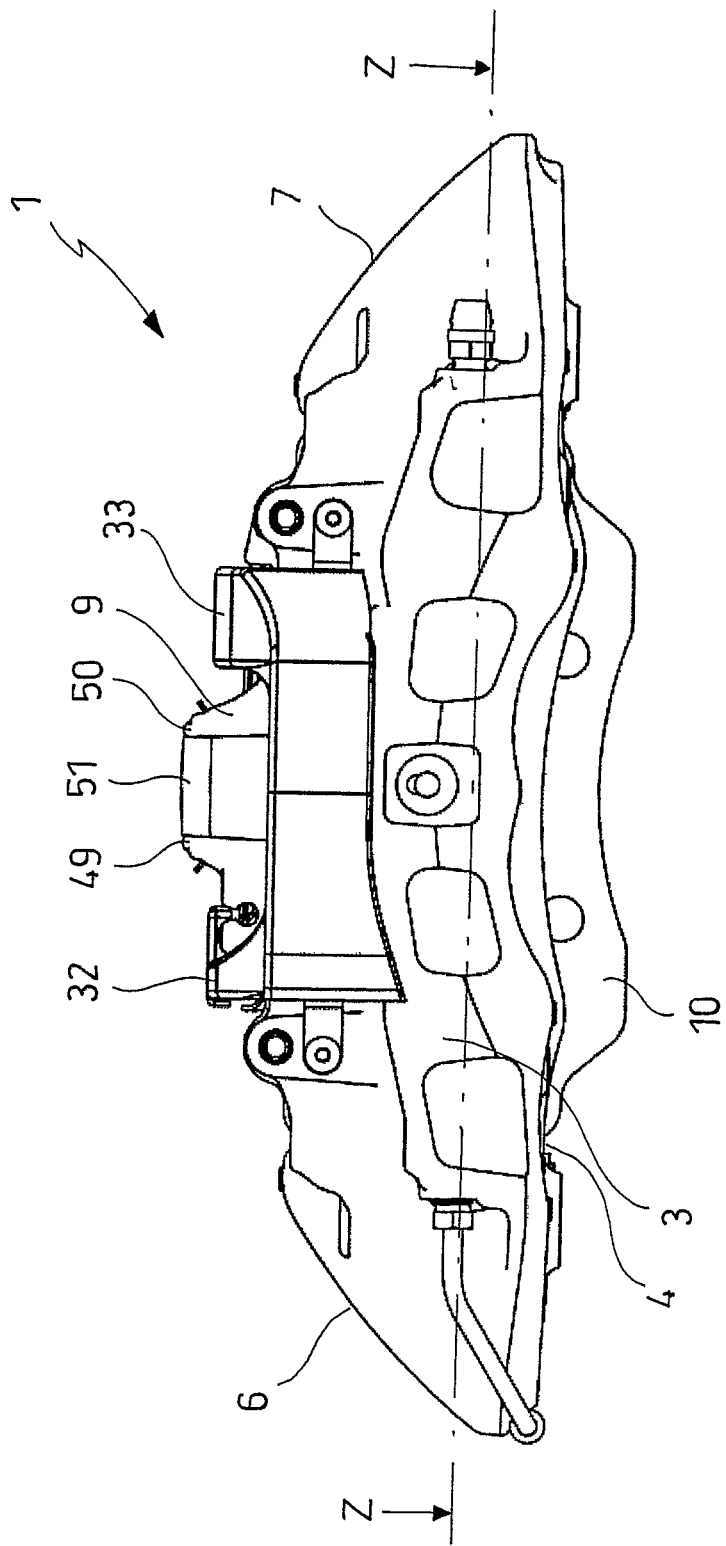
FIG. 3 is a side view of the brake caliper of the disc brake in FIG. 1.

Advantageously, the bridge element 9 comprises two outer walls 49 and 50 formed along the sides thereof, which together with a second cover 51 that is preferably though not necessarily removable and extending throughout the length of the bridge element 9, forms one or more bridge ducts, preferably two bridge ducts 52 and 53 through which the cooling air can flow, which comes from the chambers 42 and 43, respectively, of the communication passageway 40 (FIGS. 3, 4, and 6). According to an embodiment, the partition wall 44 of the communication passageway 40 extends throughout the length of the bridge element 9, such as to separate these bridge ducts 52 and 53.

Advantageously, the bridge ducts 52 and 53 communicate the communication passageway 41 of the suspension side with a second communication passageway 54 formed in the wheel side (FIGS. 5 and 7).

This second communication passageway 54 is preferably at least partially formed in the second side wall 2 of the caliper 1, and most preferably, comprises two chambers 55 and 56, which are separated from each other via the partition wall 44, and respectively in communication with the chambers 42 and 43 of the communication passageway 41 of the suspension side via the bridge ducts 52 and 53 of the bridge element 9.

The communication passageway 54 and the first and second chambers 55 and 56 thereof are preferably defined by a portion 66 of the second side wall 2 and by a third upper cover 60, which is preferably though not necessarily removable.

The cooling air blowing from the chambers 42 and 43 of the first side wall 3 can be then conveyed within the bridge ducts 52 and 53 of the bridge element 9 and reaching the chambers 55 and 56 of the second side wall 2.

Ports 57 and 58 are formed in the chambers 55 and 56, respectively, which fluidically communicate these chambers 55 and 56 with further inner cooling ducts 59 conveying the cooling air to one or more second outlet ports 22 that are formed in wheel side of the caliper 1. The inner cooling ducts 59 and the second outlet ports 22 of the wheel side are preferably formed in the second side wall 2 of the caliper 1, such as to reduce the overall inner and outer size thereof.

Advantageously, the inner cooling ducts 59 are adjacent to one or more of the cylindrical seats 64 of the cylinder-piston units that are formed in the second side wall 2 (FIGS. 8 and 9), such that the second partial cooling flows also hit the thrust means 17 being formed therein, and preferably the active ends 67 thereof, such as the radiating elements.

In accordance with an embodiment, the cylindrical housings 64 of the cylinder-piston units that are formed in the side wall 2 are in a number of three and are arranged such that one of the inner cooling ducts 59 (FIG. 9) can be arranged between each pair of adjacent cylindrical housings 64.

In accordance with an embodiment, the brake caliper comprises a ventilation lid 61, which is separately fabricated from the body of the caliper 1 and is removably connectable thereto, such as to form the brake caliper 1 (FIGS. 4 and 5). This ventilation lid 61 forms as one piece the feeding duct 23, outer cooling ducts 32 and 33 and a shell having two side portions forming the first cover 45 and the third cover 60, respectively, and a middle portion forming the second cover 51. Preferably, the ventilation lid 61 further forms the support/s 28 suitable to support the outer cooling ducts 32 and 33.

This ventilation lid 61 can be connected to the body of the caliper 1 such as by means of threaded connecting members and can be thus easily removed as required, for example in the event of technical inspections and maintenance operations.

According to a further aspect of the present invention, in order to prevent the pads 10 from impacting within the seats 13 when the vehicle is running with the brake deactivated, at least one suitable spring 18 is provided to apply an elastic preload on the pads 10 such that the latter are stopped within the seats 13 even when the brake is deactivated, thereby the vibrations and noise of the brake due to the movements of the pads 10 are reduced.

The spring 18 (FIGS. 10 and 11) comprises a longitudinal beam 69 that is defined by two ends 70 and 71. At the ends 70 and 71, the spring 18 comprises a cross beam 72 that is connected to the longitudinal beam 69 and transversal thereto, having two ends 73 and 74 suitable to engage the upper edge 16 of the plate 11 of the pads 10 to hold the latter elastically in position.

The spring 18 further comprises a coupling portion 75 that is suitable for being snap coupled to a counter-portion of the connecting structure 5 of the caliper 1, preferably with the middle bridge element 9.

The spring 18 has a substantially symmetrical shape, such as to be capable of applying such forces on the pads 10 which are also substantially symmetrical and in order to avoid different behaviours of the latter on the two sides of the brake disc 15.

The coupling portion 75 is substantially formed in the middle of the longitudinal beam 69 and also has a substantially symmetrical shape relative to the longitudinal beam 69, such as to be capable of ensuring a snap engagement with symmetrical forces with the middle bridge element 9, which is transversal to the longitudinal beam 69 when the spring 18 is mounted to the caliper 1.

Advantageously, the spring 18 is formed as one piece, preferably of a plate-like or belt-like material that is shaped such as to have only curvatures about axes that are substantially parallel to each other and substantially orthogonal to the plane P of the brake disc 15 when the spring 18 is mounted to the caliper 1.

Further advantageously, the bridge element 9 and coupling portion 75 are arranged and shaped such that, during an elastic deformation of the spring 18 that is required for bringing the two ends 73 and 74 of the cross beams 72 into pressing abutment against the upper edge 16 of the plate 11 of the pad 10, the spring 18 remains coupled to the bridge element 9.

In accordance with an embodiment, the coupling portion 75 comprises one, preferably two couplings 76 opposite relative to the longitudinal beam 69, which are substantially C-shaped, having two curved tracts 77 and 78, the concavities of which being oriented such that the coupling portion 75 can grip and laterally wrap the bridge element 9. To this purpose, it is advantageous that the latter has two outwardly convex side edges 79 and 80 that are suitable to be fitted in the concavities of the curved tracts 77 and 78 of the couplings 76, such as to facilitate the coupling by the spring 18 (see for example FIG. 6).

The C-shaped coupling portion 75 can further have a counter-portion 83 between the two curved tracts 77 and which is suitable for being at least partially abutted against a substantially plane counter-surface formed in the lower portion, i.e. facing the pads 10 of the bridge element 9. Advantageously, this counter-portion 83 comprises a concave portion 85 having a concavity oriented such that, when the spring 18 is mounted to the caliper 1, while braking, this concave portion 85 is brought to pressing abutment against the counter surface of the bridge element 9 whereas the ends 73 and 74 of the cross beams 72 engage the upper edges of the pads 10. Thereby, the pads 10 can be elastically pushed away from the bridge element 9. Preferably, the concave portion 85 runs continuously throughout the coupling portion 75, transversal to the longitudinal beam 69.

Further advantageously, the curved tracts 77 and 78 are arranged relative to each other at such a distance that the coupling portion 75, by being elastically deformed, can be interference-connected to the bridge element 9.

In accordance with a further embodiment, the curved tracts 77 and 78 of the couplings 76 are substantially S-shaped, i.e. each of them has two tracts with opposite curvatures, particularly a concave tract 79 and a convex tract 80. The concave tract 79 acts in the manner as described above with reference to the C-shaped curved tract. The convex tract 80 is suitable to press against a side surface 81 of the bridge element 9, thus ensuring a further point of support for the spring 18 on the latter, and thus a still firmer fixing (FIG. 6).

Advantageously, the plates 11 of the pads 10 define seats 82 that are suitable for accommodating the ends 73 and 74 of the cross beams 72, such as to prevent or hinder the movements of the spring 18 relative to the pads 10 in the longitudinal direction or vice versa.

The seats 82 can be shaped such as to provide a shape-coupling with the ends 73 and 74 of the cross beams. Furthermore, tracts of the upper edge 16 of the plates 11 of the pads 10 can be optionally provided with a surface roughness suitable for providing a friction coupling with the ends 73 and 74 of the cross beams 72.

Figure 12:
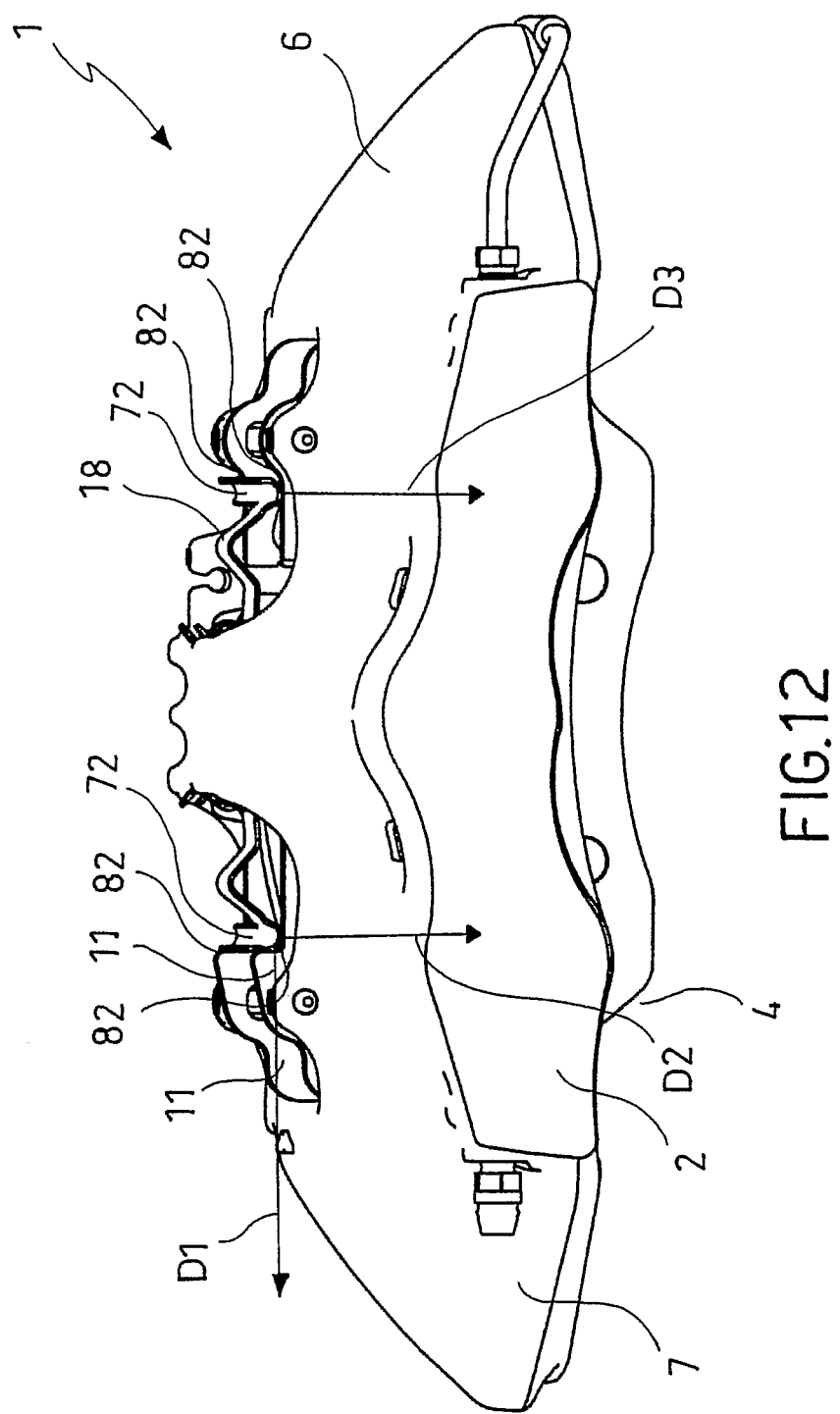
FIG. 12 is a side view of a detail of a brake caliper according to a further embodiment of the invention.
Figure 13:
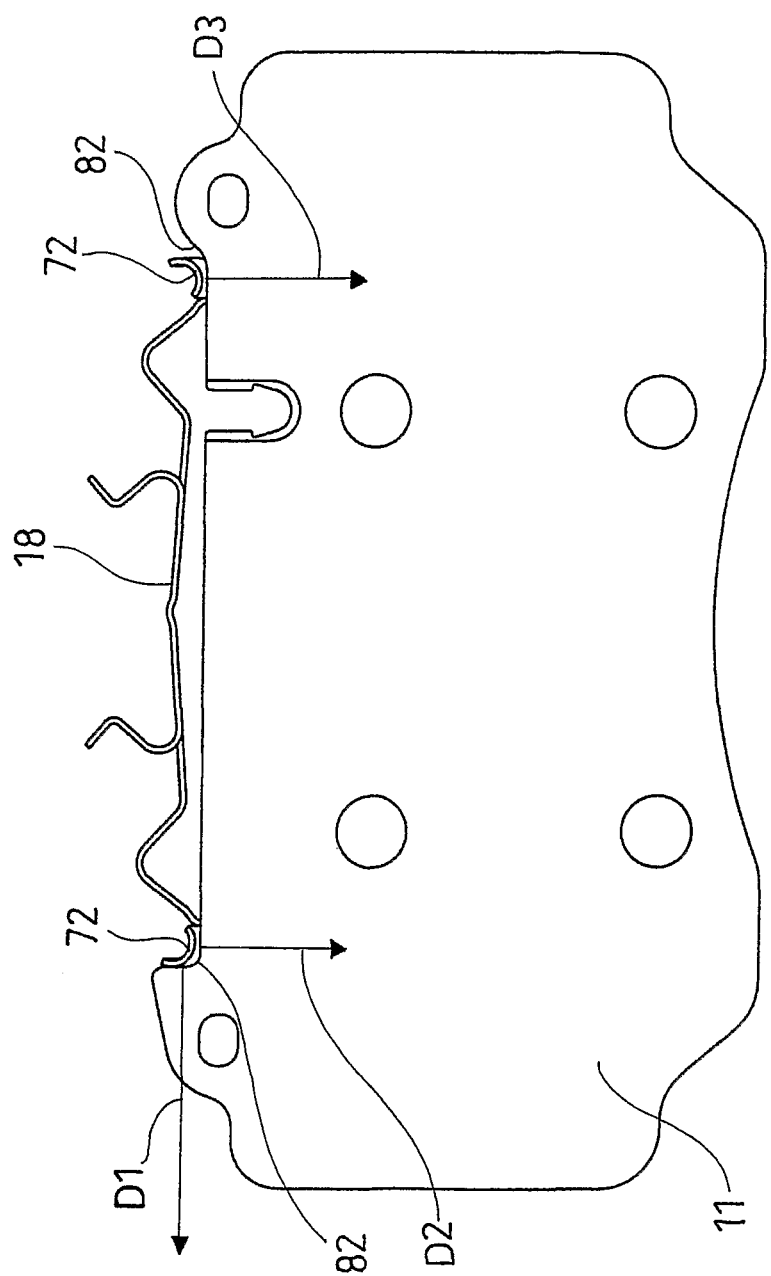
FIG. 13 is a side view of a further detail of the detail of the brake caliper in FIG. 12.

In accordance with an embodiment, the seats 82 of each plate 11 are variously shaped relative to each other, such that the cross beams 72 of the spring 18 can load each pad 10, which is asymmetrically biased while braking, in a different manner on the two sides of the bridge element 9. Preferably, the seat 82 that is arranged, when the pad 10 is mounted to the caliper 1, on the side of the bridge element 9 facing the end wall 7 is shaped such that the spring 18 pushes the plate 11 away from the bridge element 9 to the end wall 7 in a direction D1 and to the disc space 4 in a direction D2 transversal to the direction D1, and the seat 82 arranged in the side of the bridge element 9 facing the end wall 6 is shaped such that the spring 18 pushes the plate 11 to the inside of the disc space 4 in a direction D3, preferably substantially parallel to the direction D2 (by way of example, see FIGS. 12 and 13).

Figure 10:
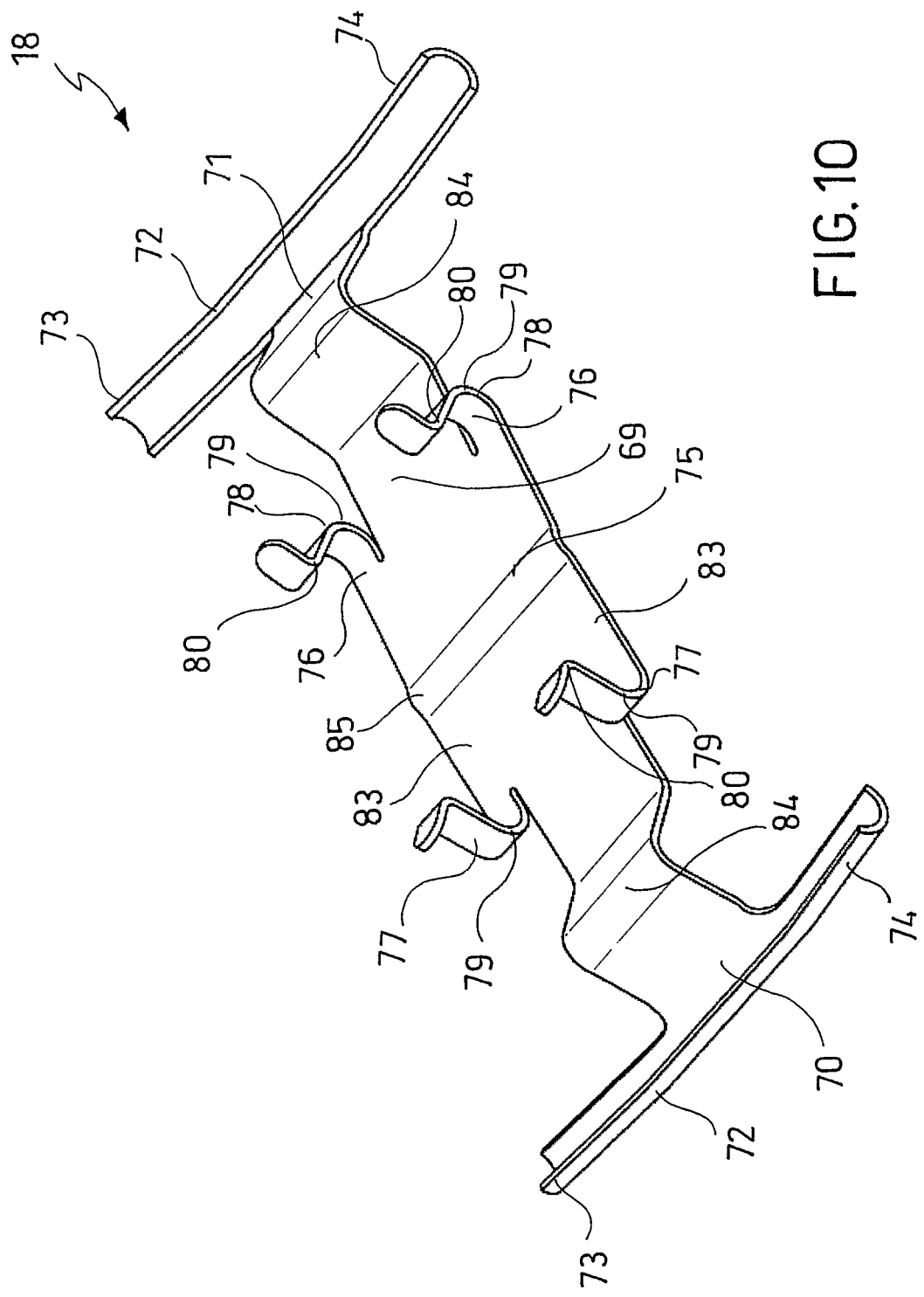
FIG. 10 is a perspective view of a further detail of the brake caliper of the disc brake in FIG. 1.
Figure 11:
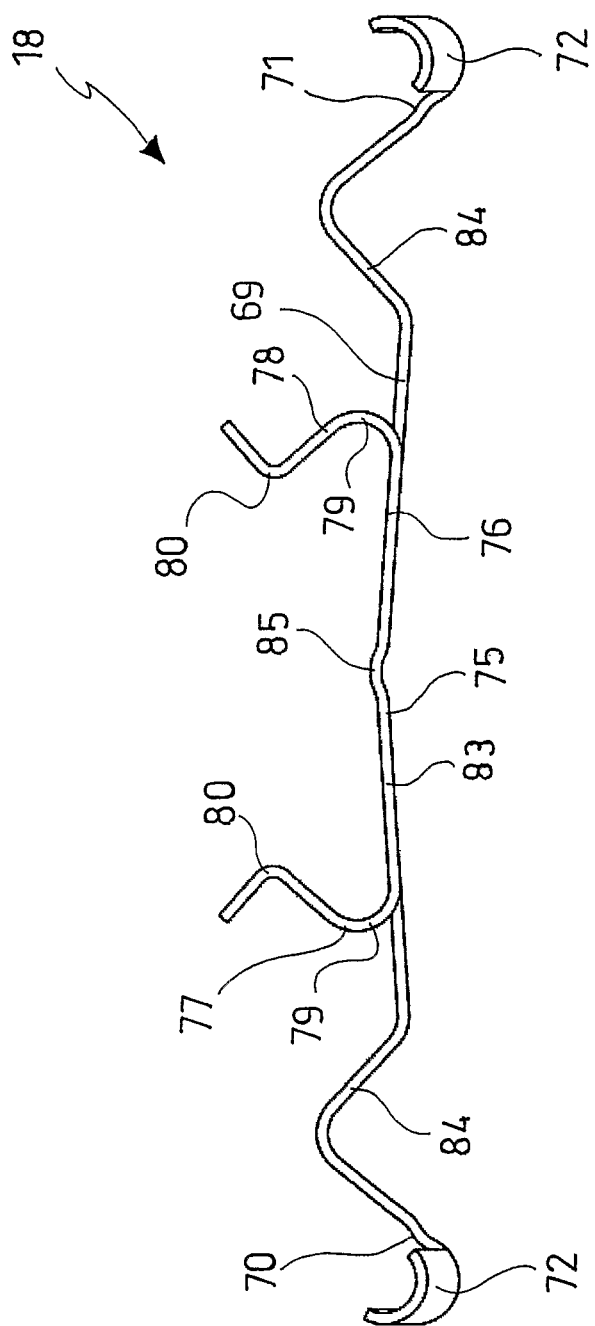
FIG. 11 is a side view of the detail in FIG. 10 of the brake caliper of the disc brake in FIG. 1.

Advantageously, the cross beams 72 are convex and configured such that, when the spring 18 is mounted to the caliper 1, this convexity faces the pads 10. Thereby, the spring 18 can elastically push the pads 10 to the side walls 2 and 3, i.e. away from the brake disk orthogonally to the plane P thereof. In accordance with an embodiment, these cross beams 72 have an at least partially polygonal shape (FIGS. 10 and 11).

Preferably, the cross beams 72 are connected to the longitudinal beam 69 without substantial thickness variations, such as to avoid substantial local rigidity variations in the spring 18.

Most preferably, the cross beams 72 have a constant section throughout the length thereof, such as C-shaped, with the convex side facing the pads 10 and in abutment against the seats 82.

Advantageously, portions 84 of longitudinal beam 69 comprised between the cross beams 72 and the coupling portion 75 have a greater length than the distance between the outer walls 49 and 50 of the bridge element 9, and the seats 82 of the pads 10, and most advantageously, they are substantially S-shaped. Thereby, the suitable preload is impressed to the spring to elastically push the cross beams 72 within the housings 82 of the pads 10.

The thus-shaped spring 18 can be advantageously also provided in brake calipers with different characteristics from those described above with reference to the brake caliper 1 according to the invention.

From the description given above, those skilled in the art may appreciate how the brake caliper according to the invention resolves the problems connected with the prior art brake calipers.

Particularly, those skilled in the art may appreciate how the brake caliper according to the invention ensures the presence of partial cooling flows on both sides of the pads, i.e. on the side of the friction surface and on the side of the thrust surface, such as to prevent overheating from occurring also in the presence of repeated violent brakings.

Furthermore, those skilled in the art may appreciate how the first partial cooling flows involve, in addition to the side of the friction surface of the pads, also the friction surfaces of the brake disc. The latter is thus also blown with cooling air on both sides thereof, which maintains the temperature thereof within suitable ranges.

Finally, those skilled in the art may appreciate how the second partial cooling flows also blow the active portions of the thrust means thus strongly restraining the transmission of heat to the braking system fluid and considerably reducing the risk of boiling for the latter.

To the embodiments described above, those skilled in the art, aiming at satisfying contingent and specific requirements, may carry out a number of modifications, adaptations or replacements of elements with functionally equivalent ones, without however departing from the scope of the claims below.

The invention claimed is:
1. A brake caliper comprising:
two side walls spaced apart from each other, which define a disc space for accommodating a portion of a brake disc, in which a first of these side walls comprises means for rotatably and translatably integrally fixing the caliper to a vehicle and the side walls are connected to each other by a connecting structure, in which each of said side walls defines at least one seat for at least one pad having (a) a friction surface that is intended to engage the brake disc and (b) a thrust surface opposite the friction surface;
each of said side walls contains at least one piston for engaging the thrust surface of the pad to push the pad against the brake disc; and
each of said side walls has cooling ducts for conveying a flow of cooling air to the pad, wherein each of said cooling ducts comprise:
a first outlet port configured to direct a first partial cooling flow at the friction surface side of the pad;
a second outlet port different from said first outlet port and configured to direct a second partial cooling flow at the thrust surface side of the pad, said second partial cooling flow being different from said first partial cooling flow,
wherein said first outlet port is arranged radially outside the pad and facing the interface between the friction surface of the pad and the corresponding friction surface of the brake disc; and
said second outlet port is formed in the first side wall of the caliper and is configured to direct said second partial cooling flow transverse to the plane defined by the friction surface of the pad, such that said second partial cooling flow directly hits said thrust surface of the pad.

2. The brake caliper according to claim 1, wherein the plane defined by the friction surface of the pad intersects said first outlet port such as to direct said first partial cooling flow to said interface between the friction surface of the pad and the friction surface of the brake disc.

3. The brake caliper according to claim 1, wherein one or more of said first outlet ports and one or more of said second outlet ports are formed on each side of the plane defined by the brake disc, such as to cool the interface between the disc and pad and the interface between the pad and pistons on both sides of the disc.

4. The brake caliper according to claim 3, comprising:
a feeding duct for the cooling air, which is arranged on the first side wall of the caliper;
one or more bridge ducts that are in communication with said feeding duct and extend astride the disc space from the first side wall to the second side wall of the caliper;
one or more outer cooling ducts that are in communication with said feeding duct and radially arranged outside the disc space, wherein said outer cooling ducts form said first outlet ports;
one or more inner cooling ducts formed in the first side wall of the caliper and in communication with said feeding duct;
one or more further inner cooling ducts that are formed in the second side wall of the caliper and in communication with said bridge ducts;
wherein said inner cooling ducts form said second outlet ports.

5. The brake caliper according to claim 4, wherein said outer cooling ducts are cantilevered from said first side wall of the caliper.

6. The brake caliper according to claim 5, wherein said outer cooling ducts are supported by one or more supports that are arranged on the second side wall of the caliper.

7. The brake caliper according to claim 4, wherein said first outlet ports are formed by diffusing elements defining an outlet slot.

8. The brake caliper according to claim 7, wherein said outlet slot has an extension parallel to the plane of the pad which is greater than or substantially equal to the width of the corresponding outer cooling duct in which said diffusing elements are formed.

9. The brake caliper according to claim 4, wherein said bridge ducts are at least partially defined by a bridge element of said connecting structure which extends astride the disc space and connects the two side walls of the caliper.

10. The brake caliper according to claim 9, wherein said bridge element is arranged halfway between two end bridges of the caliper.

11. The brake caliper according to claim 9, wherein said outer cooling ducts are in a number of two and are arranged on two opposite sides of said bridge element.

12. The brake caliper according to claim 4, wherein said inner cooling ducts are formed beside said cylindrical housings.

13. The brake caliper according to claim 12, wherein said inner cooling ducts are formed between two of said sequential cylindrical seats that are formed in the same side wall.

14. The brake caliper according to claim 4, comprising a ventilation lid which is fabricated separate from the caliper body and connected thereto, wherein said ventilation lid forms:

said feeding duct;

said outer cooling ducts; and a cover shell having a middle portion that together with the bridge element of the connecting structure defines said bridge duct as well as two side portions that define, together with corresponding portions of the side walls, communication passageways from the feeding duct to the one or more inner cooling ducts, respectively, of the first side wall and from the bridge duct to the one or more inner cooling ducts of the second side wall.

* * * * *